No. 11,798. Reissued Jan. 2, 1900.

W. H. BOUTELL.

PARING AND CORING MACHINE.

(Application filed Oct. 26, 1899.)

6 Sheets—Sheet 1.

Witnesses.
H. C. Chase.
G. A. Lowler.

Inventor
William H. Boutell
By Hey & Parsons
attys.

No. 11,798. Reissued Jan. 2, 1900.

W. H. BOUTELL.

PARING AND CORING MACHINE.

(Application filed Oct. 26, 1899.)

6 Sheets—Sheet 2.

Witnesses.
H. C. Chase,
J. A. Lowles.

Inventor.
William H. Boutell
By Key & Parsons
Attys.

No. 11,798. Reissued Jan. 2, 1900.

W. H. BOUTELL.

PARING AND CORING MACHINE.

(Application filed Oct. 26, 1899.)

6 Sheets—Sheet 3

Witnesses.
H. C. Chase,
G. A. Lowles.

Inventor.
William H. Boutell
By Hay & Parsons
Attys.

No. 11,798. Reissued Jan. 2, 1900.

W. H. BOUTELL.

PARING AND CORING MACHINE.

(Application filed Oct. 26, 1899.)

6 Sheets—Sheet 4.

Witnesses.
H. E. Chase.
J. A. Lowle.

Inventor.
William H. Boutell
By Key & Parsons
attys.

No. 11,798. Reissued Jan. 2, 1900.

W. H. BOUTELL.

PARING AND CORING MACHINE.

(Application filed Oct. 26, 1899.)

6 Sheets—Sheet 5.

Witnesses.
H. C. Chase,
G. A. Lowles.

Inventor.
William H. Boutell
By Bryson & Parsons
attys.

No. 11,798. Reissued Jan. 2, 1900.

W. H. BOUTELL.

PARING AND CORING MACHINE.

(Application filed Oct. 26, 1899.)

6 Sheets—Sheet 6.

Witnesses.

H. C. Chase.

G. A. Lowles.

Inventor.

William H. Boutell

By Kay & Parsons attys.

UNITED STATES PATENT OFFICE.

WILLIAM H. BOUTELL, OF ROCHESTER, NEW YORK.

PARING AND CORING MACHINE.

SPECIFICATION forming part of Reissued Letters Patent No. 11,798, dated January 2, 1900.

Original No. 590,205, dated September 21, 1897. Application for reissue filed October 26, 1899. Serial No. 734,995.

*To all whom it may concern:*

Be it known that I, WILLIAM H. BOUTELL, of Rochester, in the county of Monroe, in the State of New York, have invented new and useful Improvements in Paring and Coring Machines, of which the following, taken in connection with the accompanying drawings, is a full, clear, and exact description.

My invention relates to improvements in paring and coring machines of the class set forth in my prior patent, No. 405,825, dated June 25, 1889, which are particularly applicable for use in preparing apples for canning, drying, cooking, and similar operations, and has for its object the production of a device of simple construction and economical manufacture which is highly efficient and durable in use; and to this end it consists, essentially, in the general construction and arrangement of the component parts of a paring-machine, all as hereinafter more particularly described, and pointed out in the claims.

In describing this invention reference is had to the accompanying drawings, forming a part of this specification, in which like letters indicate corresponding parts in all the views.

Figure 1:
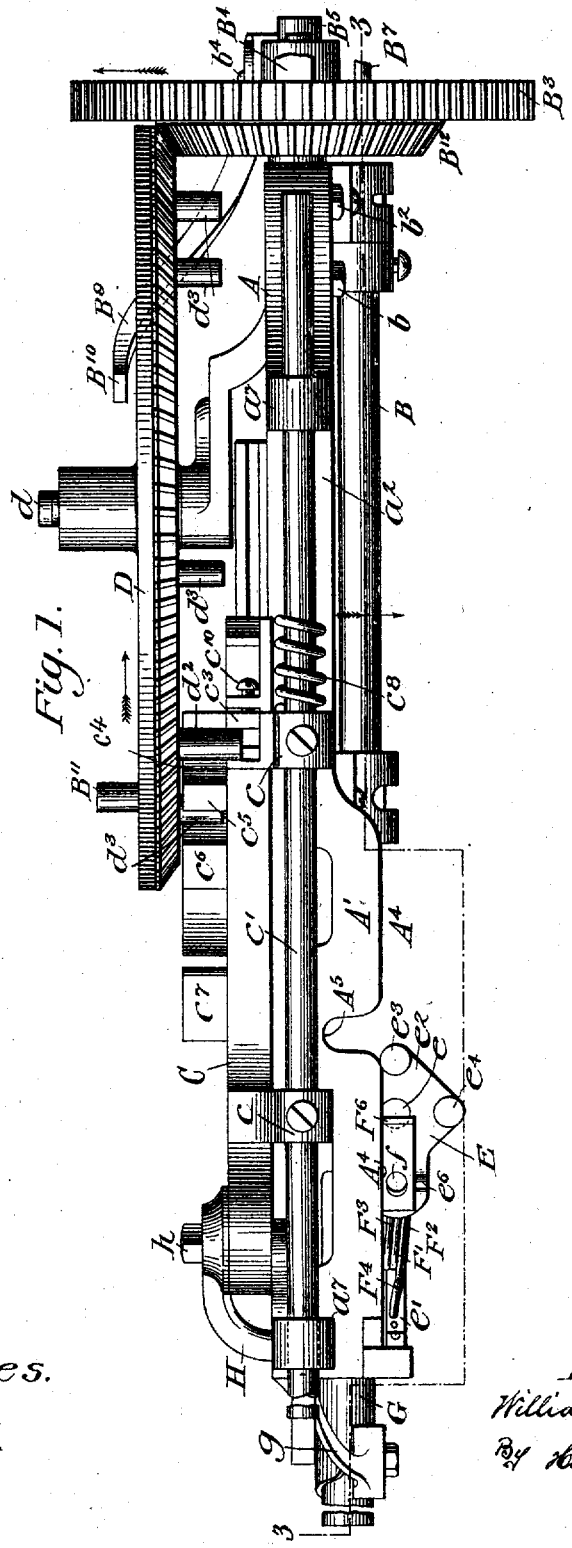
Figure 2:
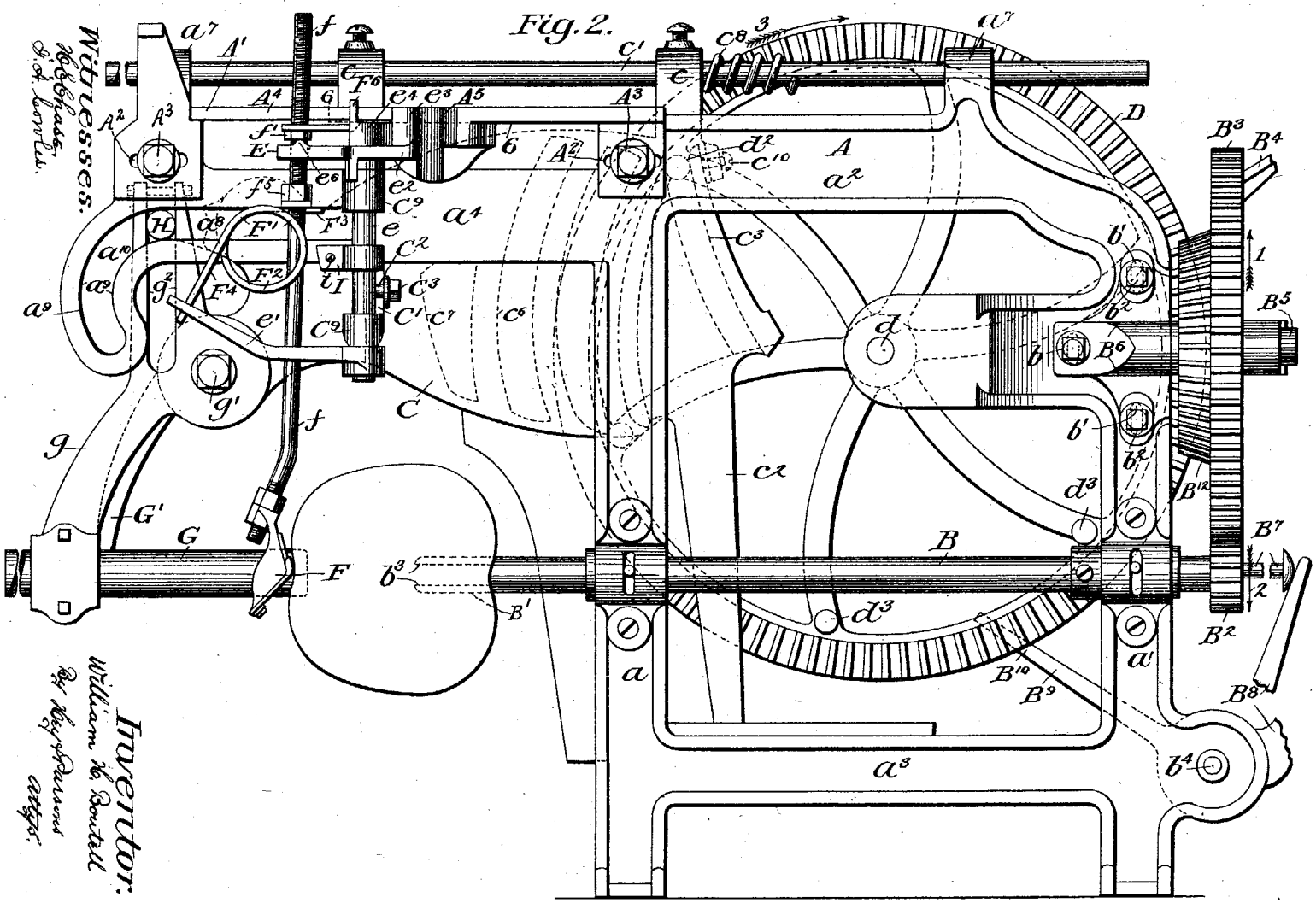
Figure 3:
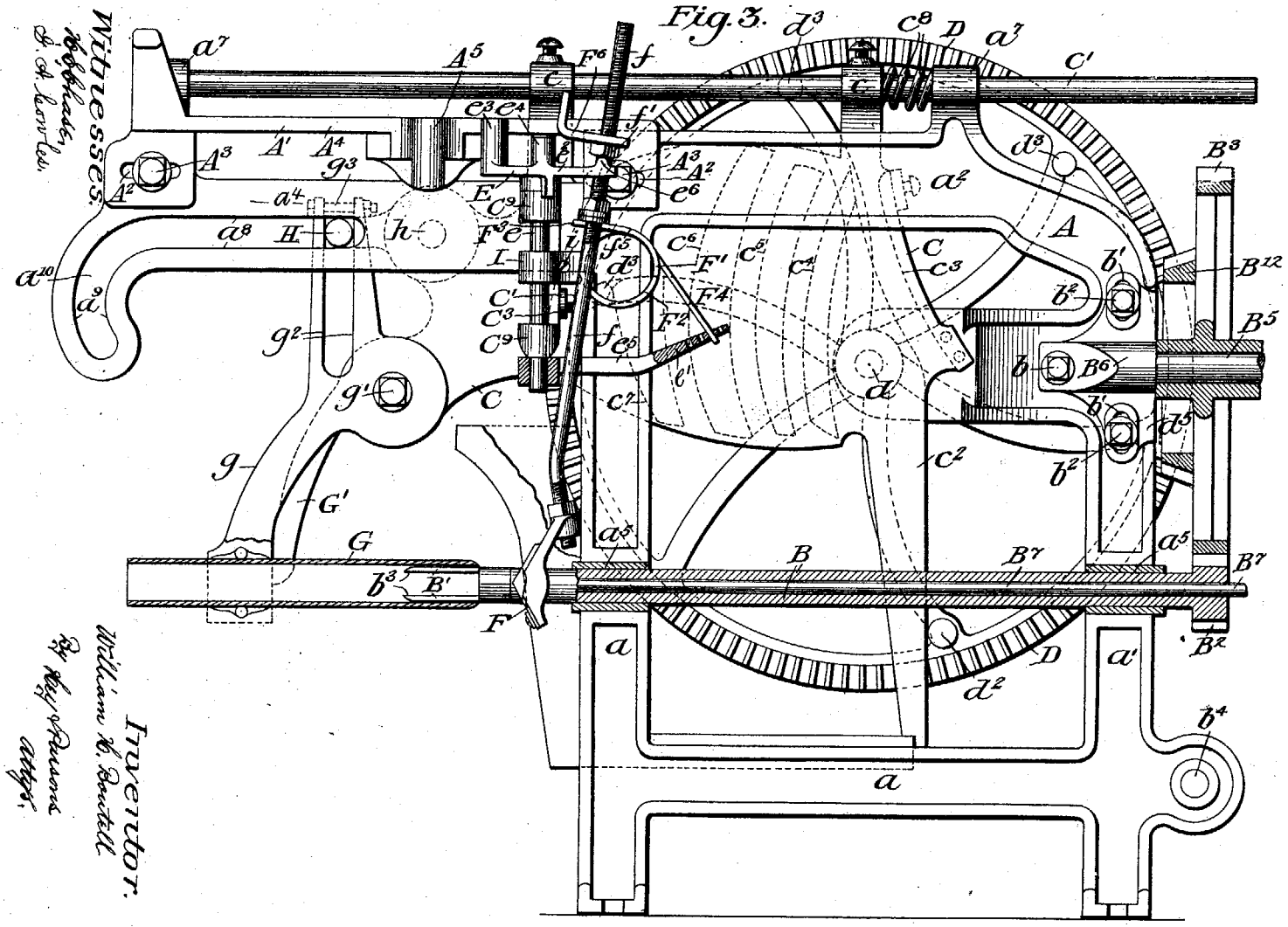
Figure 4:
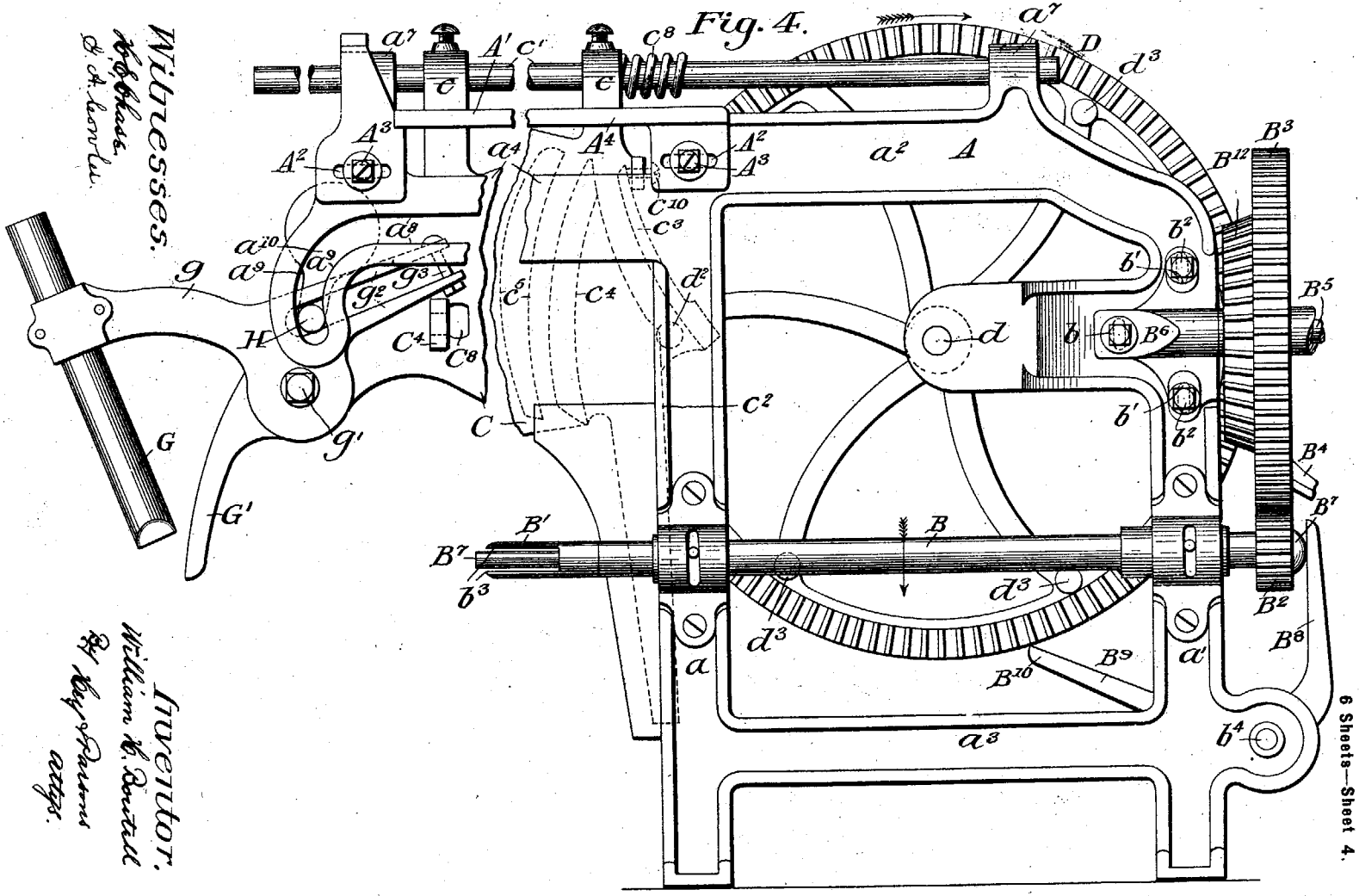
Figure 5:
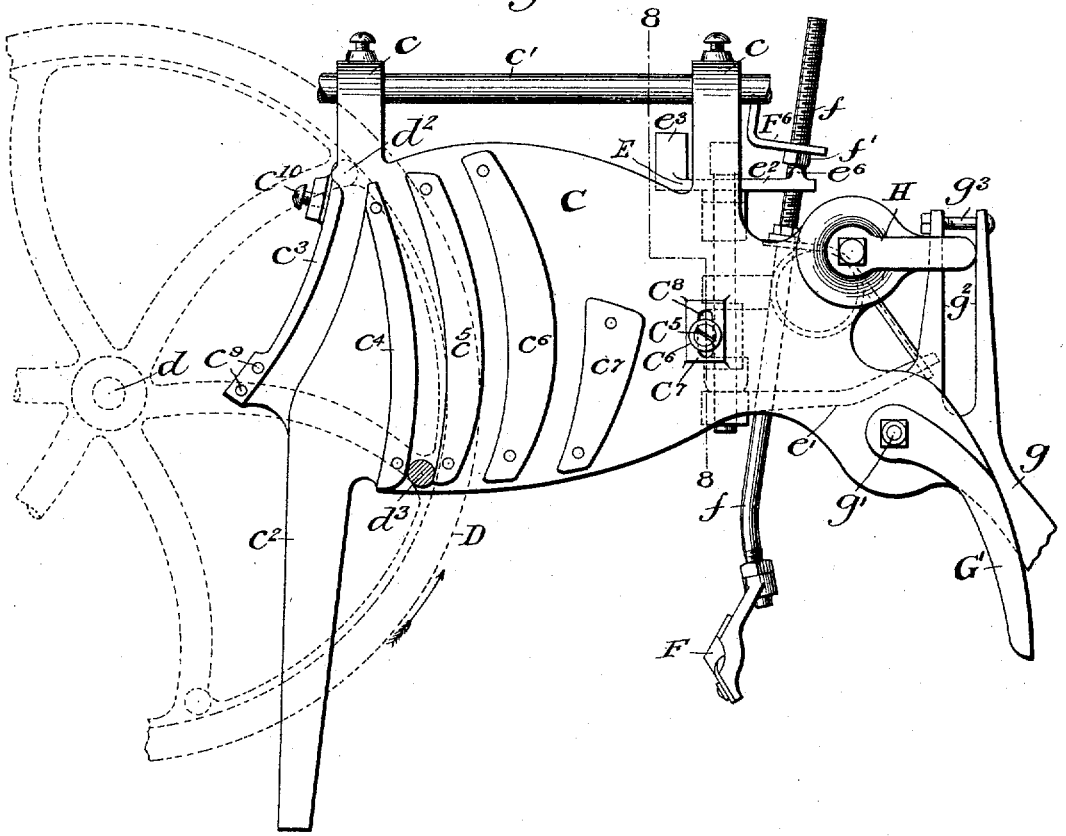
Figure 6:
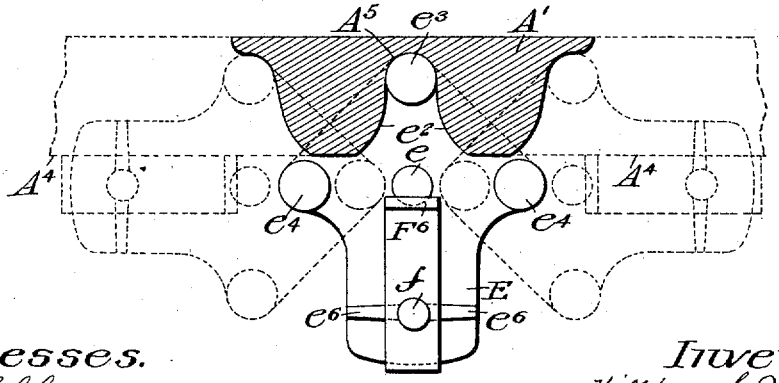
Figure 7:
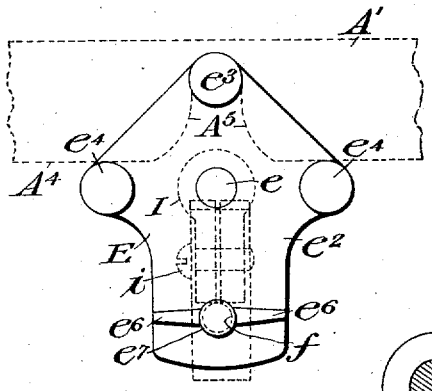
Figure 8:
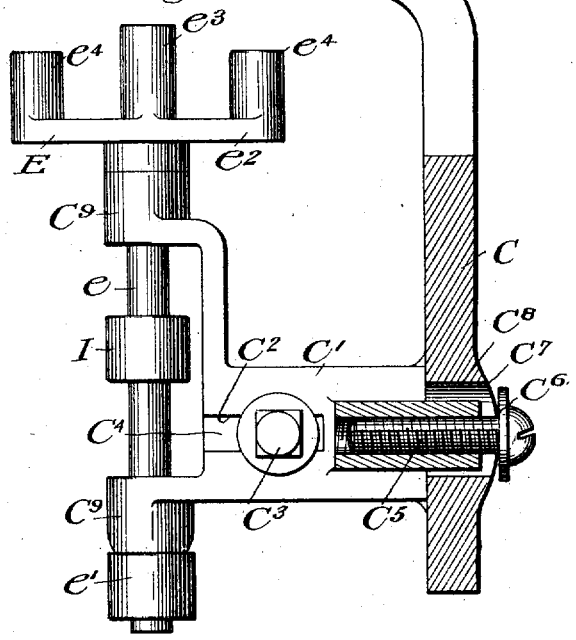
Figure 9:
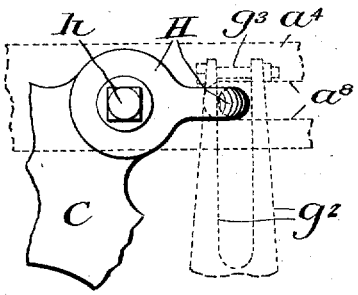

Figures 1 and 2 are respectively top plan and front elevation, partly broken away, of my improved machine, illustrating its general construction and arrangement, the parts being shown in their position assumed when about to operate upon an apple or other article to be pared. Fig. 3 is a longitudinal vertical sectional view taken on line 3 3, Fig. 1, the parts being shown in their position assumed after the apple or other article has been pared and cored and before its discharge. Fig. 4 is a front elevation, partly broken away, of my paring-machine, the parts being shown in their normal position when about to receive an apple or other article to be pared. Fig. 5 is a rear elevation of the detached carriage, illustrating particularly the cams provided thereon, the cutter being shown as operatively secured to the carriage, and a portion of the revoluble pin-carrying gear or wheel for reciprocating the carriage being indicated by dotted lines. Fig. 6 is a horizontal section taken on line 6 6, Fig. 2. Fig. 7 is a top plan view of the detached rocking head and the cutter carried thereby. Fig. 8 is a detail vertical sectional view taken on line 8 8, Fig. 5, illustrating particularly the adjustable connection to the carriage of the arm for supporting the rocking head; and Fig. 9 is a detail elevation of the latch for holding the corer and controlling the operation of the corer and adjacent portions of the carriage and frame.

The frame A may be of any desirable form, size, and construction and is here illustrated as composed of uprights or standards $a$ $a'$, upper and lower cross-bars $a^2$ $a^3$ between the opposite extremities of the standards, and a projecting arm $a^4$, extending laterally from the upper end of the standards $a$. Intermediate portions of the standards $a$ $a'$ are provided with bearings $a^5$ for supporting a shaft B, connected to actuate the support B′ for the apples or other articles being trimmed.

The support B′ is mounted upon the end of the shaft B adjacent to the standard $a$, and the opposite end of the shaft B projects beyond the standard $a'$ and is provided with a gear $B^2$, meshing with a driving pinion or gear $B^3$, provided with a suitable crank $B^4$, partly broken away, for rotating said gears in the direction indicated by arrows 1 and 2, Fig. 2.

The spindle $B^5$ of the driving pinion or gear $B^3$ is secured to an adjustable support $B^6$, which facilitates ready adjustment of the gear or pinion $B^3$ either to take up wear of the gear $B^2$ or to permit effective engagement with a new gear $B^2$. The support $B^6$ is preferably hinged at $b$ and is provided with slots $b'$ for receiving clamping-screws $b^2$, projecting from adjacent portions of the frame A. When desired to adjust the support $B^6$, the clamping-screws $b^2$ are loosened, the support $B^6$ is rocked on its pivot $b$, and the clamping-screws are then actuated to firmly hold the support in its adjusted position.

The support B′, previously mentioned, for the apple or other article to be pared may be of any desirable form, size, and construction, but preferably consists of a tip or sleeve removably secured to the shaft B and having its free end provided with engaging spurs or projections $b^3$. The shaft B, also previously mentioned, is preferably formed hollow for receiving a core-discharging rod or bar $B^7$, which is of any desirable form, size, or construction. One end of the discharging bar or rod $B^7$ is engaged by an apple or other article when forced lengthwise of the support B′, and the opposite end of said rod or bar engages and rocks backward an arm $B^8$ of a lever $B^9$, pivoted at $b^4$ to the frame A. An additional arm $B^{10}$ of the lever $B^9$ is rocked upwardly by this movement of the lever $B^9$ and is afterward engaged and rocked downwardly by a revoluble eccentrically-arranged projection or pin $B^{11}$, Fig. 1, when the apple or other article has been pared and cored, whereupon the arm $B^8$ moves the rod or bar $B^7$ longitudinally forward for discharging the core. The projection or pin $B^{11}$ may be mounted upon any suitable support, as a revoluble feeding gear or wheel D, presently described. As the particular construction of the core-discharging mechanism, consisting of the rod or bar $B^7$, the lever $B^9$, and the projection or pin $B^{11}$, forms no essential feature of my present invention, it is unnecessary to further illustrate or describe said parts.

C is a carriage movable forwardly and backwardly along the frame A for actuating the paring-cutter and the corer. This carriage may obviously be of any suitable form, size, and construction capable of the desired operation and may be suitably guided along the frame. I have here illustrated the carriage as provided with eyes *c c*, fixed to a rod *c'*, having its opposite ends movable lengthwise in eyes $a^7$ upon the frame. The mechanism for reciprocating the carriage C preferably consists of a driving wheel or gear D, mounted on a spindle *d*, journaled in the frame A and meshing with a bevel-gear $B^{12}$, fixed to the driving gear or pinion $B^8$, previously described for rotating the gear D in the direction indicated by arrow 3, Fig. 2.

The gear or wheel D is formed with a series of eccentrically-arranged projections or pins, which engage suitable cams upon the carriage C, and as the gear D is revolved the carriage is reciprocated along the frame A. The end of the carriage C adjacent to the gear or wheel D is provided with a depending cam $c^2$, extending beneath the spindle *d*. A suitable projection or pin $d^2$, mounted on the gear D, engages the cam $c^2$ and forces the carriage forwardly for returning the paring-cutter and corer to their normal position, as illustrated at Fig. 2. The cam $c^2$ and the projection or pin $d^2$ are so relatively arranged that the forward movement of the carriage to its normal position is comparatively rapid.

Directly above the cam $c^2$ is a second cam $c^3$, extending upwardly above the spindle *d* for quickly retracting the carriage into its position assumed when the paring-cutter, presently described, is engaged with the apple or other article to be pared. In advance of the cam $c^3$ are a series of comparatively similar cams $c^4$ $c^5$ $c^6$ $c^7$, arranged one in advance of the other, the outer cams having their engaging faces formed of greater curvature than the face or faces of one or more of the intermediate cams for moving the carriage rearwardly slower when its paring-cutter is engaged with the ends of the article being pared. The cams $c^3$, $c^4$, $c^5$, $c^6$, and $c^7$ are preferably formed by a series of ribs upon the face of the carriage C adjacent to the driving-gear D, but may obviously be formed by a series of grooves, if desired. The cams $c^4$ $c^5$ $c^6$ $c^7$ are engaged by a series of eccentrically-arranged projections or pins $d^3$, which are secured to the gear or wheel D and as said gear is revolved operate to move the carriage rearwardly into position to be again moved forwardly by the engagement of the cam $c^2$ and the projection or pin $d^2$. A suitable spring $c^8$, mounted on the rod *c'*, engages one of the eyes $a^7$ when the carriage approaches the limit of its rearward movement and operates to cushion said carriage.

The projection or pin $d^2$, previously described, which engages the cam $c^2$ of the carriage C, also engages the cam $c^3$ and moves the carriage C rearwardly, so that the corresponding projection or pin $d^3$ is moved into engagement with the cam $c^4$. As the movement of the carriage effected by the engagement of the cam $c^3$ and the projection or pin $d^2$ is comparatively rapid and as said projection or pin $d^3$ must engage the cam $c^4$ before the projection or pin $d^2$ leaves the cam $c^3$, the rib forming said cam $c^3$ is preferably adjustable on the carriage C. Said rib is preferably formed of spring material, and its lower end is fixed to the carriage C by pins $c^9$, and its upper end is engaged by a suitable adjusting-screw $c^{10}$, which takes up all wear and insures the desired engagement of the cam $c^4$ and the corresponding projection or pin $d^3$.

As clearly seen at Fig. 1, the cams $c^4$ $c^5$ $c^6$ $c^7$ are arranged nearer to the wheel D than the cams $c^2$ $c^3$, and are therefore movable in planes at one side of the planes of movement of said cams $c^2$ $c^3$. The projections or pins $d^3$ are therefore formed shorter than the projection or pin $d^2$, a portion of which is movable in a plane at one side of or beyond the plane of movement of the projections or pins $d^3$ in order that the pins $d^3$ may revolve without engaging the cams $c^2$ $c^3$.

The carriage C carries a rocking head E, which supports the paring-cutter, and is mounted upon an arm C', extending laterally from the carriage C and adjustably secured thereto. The arm C' is provided with a slot or aperture $C^2$ for receiving a clamping-bolt $C^3$, secured to a similar arm $C^4$, fixed to the carriage, and lateral movement of the arm C' is thus permitted by loosening the bolt $C^3$. The end of the arm C' adjacent to the carriage C is provided with a clamp or screw $C^5$, having one of its ends passed through an aperture $C^8$ in the carriage and provided with an adjustable shoulder $C^6$, movable along a curved face $C^7$ on the carriage C for permitting more or less vertical rocking movement of the arm C'. These lateral and vertical adjustments of the arm C', supporting the rocking head which carries the paring-cutter, are highly essential, as it is necessary to permit of more or less adjustment of said cutter.

The rocking head E consists, preferably, of a spindle $e$, journaled in ears $C^9$, projecting from the arm C′ and provided with a spring supporting-arm $e'$ and a toothed arm or section $e^2$. As the carriage C is reciprocated the head E is rocked, and this movement of the head E is effected by teeth or projections $e^3$ $e^4$ thereon, which engage a bar A′, provided upon the frame A and formed with a series of recesses for receiving the teeth or projections $e^3$ $e^4$. In order to insure the most effective engagement of the teeth or projections $e^3$ $e^4$ with the walls of the recesses of the bar A′, said bar is preferably adjustable lengthwise, being provided at its opposite ends with apertures or slots $A^2$ for receiving clamping-screws $A^3$. It is evident, however, that the bar A′ may be fixed to the frame A, if desired. It is thus apparent that as the carriage C is reciprocated the head E is rocked backwardly and forwardly.

The paring-cutter F is of any desirable form, size, and construction, unnecessary to herein further illustrate or describe, and is provided with an upwardly-extending shank $f$, having its intermediate portion movable lengthwise of the spring supporting-arm $e'$ in a slot $e^5$ therein and its upper extremity hinged to the toothed arm or section $e^2$. An adjustable shoulder or nut $f'$ upon the shank $f$ adjusts the paring-cutter vertically and rests upon opposite projections $e^6$, of limited width, for permitting the hinged movement of the upper end of the shank $f$, which is passed through a perforation or slot $e^7$ in the arm or section $e^2$. A stop-shoulder I, movable lengthwise on the spindle $e$, between the arms $e'$ $e^2$, is firmly held in position by a clamp $i$ and engages the adjacent portion of the cutter-shank $f$ and limits the movement of the lower end of the cutter-shank $f$ toward the spindle $e$, as effected by the spring F′, immediately described.

A spring F′ forces the paring-cutter toward the shaft or spindle $e$ into position to engage the article mounted upon the support B′, previously described. This spring preferably consists of a substantially horizontal coil $F^2$ and arms $F^3$ $F^4$, extending laterally from the coil $F^2$. The coil $F^2$ is arranged above the arm $e'$, and the arms $F^3$ $F^4$ are connected, respectively, to the shank $f$ and the arm $e'$. The arm $F^3$ is preferably passed through an aperture in the shank $f$ and is secured to said shank by an adjustable support $f^5$, and the arm $F^4$ is passed through one of a series of perforations in the arm $e'$, which forms an adjustable support for the spring-arm $F^4$. This arrangement and connection of the spring permit the paring-cutter to rock laterally independently of the head E and enable the knife to effectually pare uneven surfaces.

It is extremely desirable to prevent the paring-cutter F from rocking laterally independently of the head E at the commencement and end of the operation of said cutter, or, in other words, when paring the ends of said article. This object is effected by forming one tooth or projection $e^3$ of the toothed arm or section $e^2$ of greater length than adjacent teeth or projections of said toothed arm or section, as the outer teeth $e^4$ thereof, and by engaging the projecting portion of the tooth $e^3$ and a shoulder $F^6$ upon the paring-cutter shank $f$ with an engaging face $A^4$, preferably formed upon the bar A′. The engaging face $A^4$ is arranged out of alinement with the recesses of the bar A′ and extends lengthwise in a plane substantially coincident with the extremities of said recesses. Said face $A^4$ is formed with an inwardly-extending cut-out $A^5$, which is alined with one of the recesses of the bar A′ and receives the upper end of the elongated tooth or projection $e^3$ when the paring-cutter is engaged with the intermediate portion of the article being pared, and said cutter F is permitted to rock laterally independently of the head E. The shoulder $F^6$ is of any desirable form, size, and construction and is preferably movable lengthwise of the shank $f$. It is thus apparent that when the paring-cutter first engages the adjacent end or portion of the article being pared the projecting portion of the tooth or projection $e^3$ and the shoulder $F^6$ are engaged with the face $A^4$ and prevent the cutter from rocking laterally independently of the head E, that as the rocking-head carrying the paring-cutter is rocked by the rearward movement of the carriage connected thereto and the engagement of the teeth or projections $e^4$ with the walls of the recesses of the bar A′ the elongated tooth $e^3$ registers with the cut-out $A^5$ in the engaging face $A^4$ and the shoulder $F^6$ is rocked outwardly from engagement with said engaging face, thus permitting the paring-cutter to rock laterally independently of the head E, and that as the carriage continues its movement the tooth $e^3$ and the shoulder $F^6$ engage with the portion of the face $A^4$ on the opposite side of the cut-out $A^5$ and again hold the paring-cutter from rocking laterally independently of the head at the time said cutter is engaged with the opposite end of the article being pared.

The corer G is of any desired form, size, and construction, and preferably consists of a tube secured to one end of a support or lever $g$, pivoted at $g'$ to the carriage C. The opposite end of the support or lever $g$ is provided with separate bearing-faces $g^2$ $g^2$, formed by a suitable slot, and these bearing-faces are adjusted toward and away from each other by a suitable clamp or bolt $g^3$, the under face of which forms the outer wall of the slot forming the faces $g^2$ $g^2$. The frame-arm $a^4$ is provided with bearing-faces $a^8$, having downwardly-deflected or laterally-extending portions $a^9$ at their free extremities, and these faces are preferably formed by a slot $a^{10}$. A suitable latch H is pivoted at $h$ to the carriage C and is provided with a laterally-extending end interposed between the faces $g^2$ $g^2$ and arranged beneath the bearing-faces $a^8$.

The corer is arranged normally in an inclined plane, as illustrated at Fig. 4, and the lateral end of the latch is arranged at the bases of the deflected portions $a^9$ of the bearing-faces $a^8$. As the carriage is moved rearwardly, as previously described, the portion $a^9$ of one of said faces $a^8$ elevates the laterally-extending end of the latch H and rocks the support or lever $g$ upon its pivot $g'$ until the corer G assumes a substantially horizontal plane in alinement with the support B' for the article to be pared. The latch H holds the corer in this position, and but a minimum amount of friction is produced by the backward movement of the corer and its support or lever $g$, as the only surfaces in contact with the latch H are the faces $a^8$ $g^2$.

The end of the corer G adjacent to the support B' is of sufficient diameter to encircle said support, and as the carriage completes its rearward movement the corer enters the article being pared in the usual manner and severs the core from the remaining portion thereof. As the carriage is moved forwardly to its normal position the pared and cored article which then encircles the corer is carried by the corer until the latch H is depressed by engagement with the deflected portion $a^9$ of one of the faces $a^8$, whereupon the corer-support is rocked on its pivot $g'$, and the apple is engaged with a stationary arm G' upon the carriage and is forcibly discharged from the corer.

In the operation of my invention, as will be readily understood upon reference to the foregoing description and the accompanying drawings, the apple or other article to be pared is placed upon its support. The feed-wheel is rotated and operates to rotate the apple-support and move the carriage in one direction along the frame, thus actuating the rocking head and the cutter carried thereby and effecting the paring of the apple. The continued movement of the feed-wheel brings the corer into operative position and effects removal and discharge of the pared apple and core, whereupon a fresh apple is engaged with the machine.

The detail construction and arrangement of the parts of my invention may obviously be somewhat changed, and consequently I do not herein limit myself to such exact detail construction and arrangement.

Having thus fully described my invention, what I claim as new, and desire to secure by Letters Patent, is—

1. In a paring-machine, the combination of a frame, a cutter, a carriage reciprocally movable upon the frame for actuating the cutter, a series of cams fixed to the carriage and arranged one in advance of the other, and a series of revoluble eccentrically-arranged projections or pins movable successively into and out of engagement with the cams for feeding the carriage in one direction, and means for moving the carriage in the opposite direction during the partial revolution of the projections or pins when disengaged from the cams, substantially as and for the purpose described.

2. In a paring-machine, the combination of a frame, a cutter, a carriage reciprocally movable upon the frame for actuating the cutter, a series of cams fixed to the carriage and arranged one in advance of the other and having engaging faces of different curvature, an additional cam secured to the carriage, a series of revoluble eccentrically-arranged projections or pins movable successively into and out of engagement with said cams arranged one in advance of the other for feeding the carriage in one direction, and an additional revoluble eccentrically-arranged projection or pin movable into and out of engagement with the additional cam secured to the carriage for moving the carriage in the opposite direction during the partial revolution of the former revoluble projections or pins when disengaged from the cams engaged thereby, substantially as and for the purpose specified.

3. In a paring-machine, the combination of a frame, a cutter, a carriage reciprocally movable upon the frame for actuating the cutter, a series of cams fixed to the carriage and arranged one in advance of the other and having engaging faces of different curvature, means for adjusting the position of one of said cams, an additional cam secured to the carriage, a series of revoluble eccentrically-arranged projections or pins movable successively into and out of engagement with said cams, arranged one in advance of the other for feeding the carriage in one direction, and an additional revoluble eccentrically-arranged projection or pin movable into and out of engagement with the additional cam secured to the carriage for moving the carriage in the opposite direction during the partial revolution of the former revoluble projections or pins when disengaged from the cams engaged thereby, substantially as and for the purpose set forth.

4. In a paring-machine, the combination of a frame, a cutter, a carriage reciprocally movable upon the frame for actuating the cutter, a series of cams fixed to the carriage and arranged one in advance of the other, an additional cam secured to the carriage and extending beneath the former cams, a rotary wheel, an eccentrically-arranged projection or pin secured to the wheel for engaging the additional cam and one of said series of cams, and additional eccentrically-arranged projections or pins secured to said wheel for engaging the remaining cams fixed to the carriage, substantially as set forth.

5. In a paring-machine, the combination of a frame, a cutter, a carriage reciprocally movable upon the frame for actuating the cutter, a series of cams fixed to the carriage and arranged one in advance of the other, an additional cam secured to the carriage, a series of revoluble eccentrically-arranged projections or pins movable successively into and out of engagement with the cams arranged one in advance of the other for feeding the carriage in one direction, and an additional revoluble eccentrically-arranged projection or pin movable into and out of engagement with the additional cam secured to the carriage for moving the carriage in the opposite direction during the partial revolution of the former revoluble projections or pins when disengaged from the cams engaged thereby, and a spring for limiting the movement of the carriage in one direction, substantially as and for the purpose specified.

6. In a paring-machine, the combination of a frame provided with a series of recesses and a bearing-face arranged out of alinement with the recesses, a carriage movable along the frame, a rocking head journaled in the carriage and provided with teeth or projections for entering the recesses of the frame, one of the teeth or projections of the rocking head being elongated and movable into engagement with the bearing-face of the frame, and a paring-cutter supported by the rocking head, substantially as and for the purpose described.

7. In a paring-machine, the combination of a frame provided with a series of recesses and having an engaging face extending lengthwise in a plane substantially coincident with the extremities of said recesses, said engaging face being provided with an inwardly-extending cut-out alined with one of said recesses, a carriage movable along the frame, a rocking head journaled in the carriage and provided with teeth or projections for entering the recesses of the frame, an intermediate tooth or projection of the rocking head being elongated and engaged with said bearing-face and the walls of its cut-out, and a paring-cutter supported by the rocking head, substantially as and for the purpose set forth.

8. In a paring-machine, the combination of a frame, a bar adjustable lengthwise on the frame and provided with a series of recesses and a bearing-face arranged out of alinement with the recesses, means for holding the bar in its adjusted position, a carriage movable along the frame, a rocking head journaled in the carriage and provided with teeth or projections for entering the recesses of the bar, one of the teeth or projections of the rocking head being elongated and movable into engagement with the bearing-face of the bar, and a paring-cutter supported by the rocking head, substantially as and for the purpose specified.

9. In a paring-machine, the combination of a frame, a carriage movable along the frame, a rocking head journaled in the carriage, and a paring-cutter supported by the head and rocking laterally independently of the head, and means, substantially as described, for intermittently preventing the cutter from rocking laterally independently of the head, substantially as and for the purpose described.

10. In a paring-machine, the combination of a frame provided with a series of recesses and a bearing-face, a carriage movable along the frame, a rocking head journaled in the carriage and provided with teeth or projections for entering the recesses of the frame, one of the teeth or projections of the rocking head being movable into and out of engagement with said face, a paring-cutter supported by the head and rocking laterally independently of the head, the cutter being provided with a shank having a shoulder as $F^6$ for engaging said bearing-face, substantially as and for the purpose set forth.

11. In a paring-machine, the combination of a frame provided with a series of recesses and a bearing-face arranged out of alinement with the recesses, a carriage movable along the frame and provided with a laterally-extending adjustable arm, means for securing the arm in its adjusted position, a rocking head journaled in the arm and provided with teeth or projections for entering the recesses of the frame, one of the teeth or projections of the rocking head being elongated and movable into engagement with the bearing-face of the frame, and a paring-cutter supported by the rocking head, substantially as specified.

12. The combination with a frame having an engaging face, a carriage movable along the frame and provided with a pivoted support having a corer at one extremity and an engaging face extending toward the first-mentioned engaging face, and a latch secured to the carriage for engaging said faces and holding the corer in operative position, substantially as described.

13. The combination with a frame having an engaging face, a carriage movable along the frame and provided with a pivoted support having a corer at one extremity and opposite engaging faces extending toward the first-mentioned engaging face, a clamp for adjusting the opposite engaging faces, and a latch secured to the carriage for engaging said faces and holding the corer in operative position, substantially as specified.

14. The combination with a frame provided with an engaging face having a laterally-deflected portion, a carriage movable along the frame and provided with a pivoted support having a corer at one extremity and an engaging face extending toward the first-mentioned engaging face, and a movable latch having a shoulder engaged with the faces of the frame and carriage and movable along the deflected portion of the first-mentioned engaging face, substantially as described.

In testimony whereof I have hereunto signed my name, in the presence of two attesting witnesses, at Syracuse, in the county of Onondaga, in the State of New York, this 11th day of July, 1894.

WILLIAM H. BOUTELL.

Witnesses:
CLARK H. NORTON,
K. H. THEOBALD.